Figure 1:
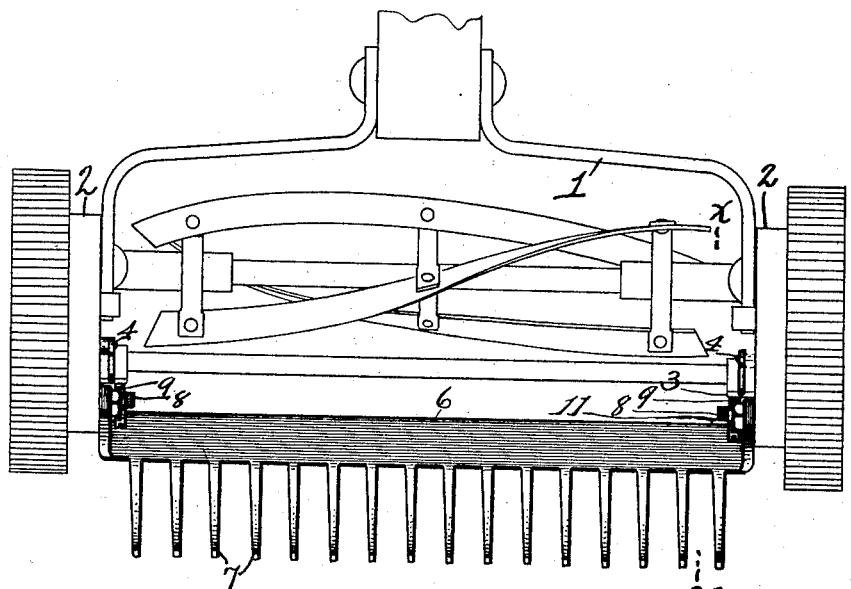

No. 758,080. PATENTED APR. 26, 1904.
W. G. JOHNSON.
LAWN MOWER ATTACHMENT.
APPLICATION FILED JAN. 9, 1904.
NO MODEL.

Witnesses:
C. F. Kesson.
E. V. Roberts.

Inventor:
Walter G. Johnson.
By his Attorney
Oscar A. Taft

No. 758,080.

Patented April 26, 1904.

UNITED STATES PATENT OFFICE.

WALTER G. JOHNSON, OF WARREN, MASSACHUSETTS.

LAWN-MOWER ATTACHMENT.

SPECIFICATION forming part of Letters Patent No. 758,080, dated April 26, 1904.

Application filed January 9, 1904. Serial No. 188,401. (No model.)

*To all whom it may concern:*

Be it known that I, WALTER G. JOHNSON, of Warren, in the county of Worcester and State of Massachusetts, have invented certain new and useful Improvements in Lawn-Mower Attachments; and I do hereby declare that the following is a full, clear, and exact description of the same.

This invention relates to harvesting machinery, and particularly to a class thereunder known as "lawn-mowers."

An object of this invention is to provide novel means for elevating the grass in order that the cutter-blades may come in contact therewith, it being a well-known fact that the wheels of a lawn-mower press the grass into such close contact with the ground that the blades or cutter of a lawn-mower do not come into contact with the said grass. It also happens sometimes that the grass lies flat on the ground from other causes and requires a rake before it stands in position to be engaged by the cutting apparatus of a lawn-mower. It is therefore the object of this invention, as stated, to engage the grass and raise it from the ground.

Furthermore, an object of the invention is to provide novel means for adjusting the position of the attachment with relation to the lawn-mower—that is, for retaining it in operative position or for holding it in such position that it will not operate or interfere with the use of the lawn-mower in any way.

Furthermore, an object of the invention is to provide novel means for adjusting the position of the points of the attachment whereby the said points may be raised or lowered with relation to the ground, means being also provided for retaining the attachment in the various adjustments mentioned.

Finally, an object of the invention is to provide a lawn-mower of the character noted which will possess advantages in points of simplicity and durability, proving at the same time satisfactory in use and comparatively inexpensive to produce and maintain.

With the foregoing and other objects in view the invention consists in the details of construction and in the arrangement and com-
bination of parts to be hereinafter more fully
set forth and specifically claimed.

In describing the invention in detail reference will be had to the accompanying drawings, forming part of this specification, wherein like characters denote corresponding parts throughout the several views, in which—

Figure 2:
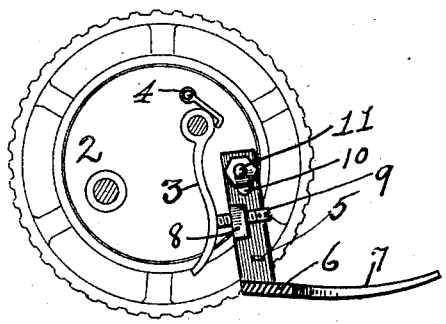
Figure 3:
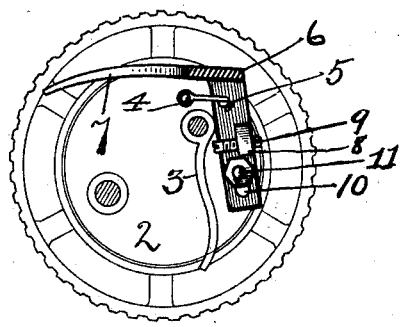
Figure 4:
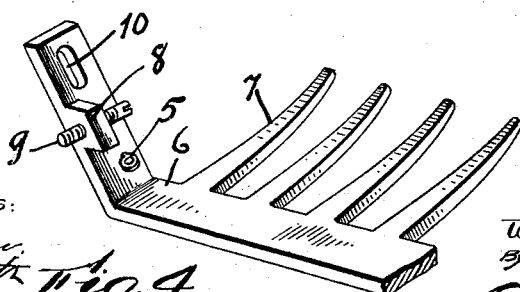

Figure 1 is a plan view of a lawn-mower with the attachment applied thereto. Fig. 2 is a sectional view on the line *x x* of Fig. 1. Fig. 3 is a similar view showing the attachment out of operative position. Fig. 4 is a perspective view of a fragment of the attachment.

In the drawings, 1 denotes an ordinary lawn-mower with a gear-casing 2 on each end, each of said gear-casings having on its inner face a rib 3, which is curved longitudinally. A hook 4 is mounted on the face of each casing and is designed for the purpose of engaging the eye 5, carried by the head 6 of the attachment.

The attachment resembles a rake in that it has a head 6 and teeth 7, the said teeth being here shown as integral with the head, though the construction in this respect may be varied.
The ends of the head are bent at right angles to the main portion, and each of the said ends has a lug threaded to receive the adjusting-screw 9, the said adjusting-screw being provided to rest against the member 3 for the purpose of adjusting the ends of the teeth of the attachment with relation to the ground, as will be fully apparent from an inspection of Fig. 2. The ends of the head are also provided with slots 10, which are slidable on the threaded studs 11, which studs project from the inner faces of the gear-casing. The studs 11 may be integral with the casing or they may consist of bolts run through the casing, with the head of the bolt lying on the inside of the casing, but this being a detail of construction which need not be dwelt upon.

As will be apparent from an inspection of Fig. 3, the attachment may be swung out of operative position, with the teeth thereof lying over the dividing bar and blades, in which position it will not interfere with the operation as a lawn-mower of ordinary construction. Where the grass is tangled, however, and lies flat on the ground from any cause, the attachment will be used, for the reason that it accomplishes a desirable result and one which will not be dispensed with after it has once been employed. By the use of the screw 9 the points of the teeth may be raised or lowered to suit the conditions of the ground over which the machine is to be operated, it being understood that where the ground is uneven or has obstructions of any kind the points of the teeth should be considerably elevated, while if the lawn is level and well kept the teeth might be made to assume an approximately horizontal position, as the said teeth are curved slightly, so that the points always lie above the main portions of the said teeth.

The construction, operation, and advantages will, it is thought, be understood from the foregoing description, it being noted that various changes may be resorted to in the proportions and details of construction for successfully carrying the invention into practice without departing from its scope.

Having fully described the invention, what I claim as new, and desire to secure by Letters Patent, is—

1. In an attachment for lawn-mowers, the combination with the casings of the gear-wheels each of which is provided with a rib, a grass-lifting attachment hinged with relation to the casings, lugs connected to the grass-lifting attachment and screws in said lugs bearing on the ribs substantially as described.

2. In combination with the gear-casings of a lawn-mower, a rake-like attachment pivotally mounted on the casings and means for adjusting the position of the attachment.

3. In an attachment for lawn-mowers, a head having teeth, the ends of the head being bent with relation to the main portion, lugs formed with the head, adjusting-screws threaded through the lugs and suitable bearings for the ends of the said screws, substantially as described.

4. In an attachment for lawn-mowers, a head having teeth, the ends of the head being bent with relation to the main portion, lugs formed with the head, adjusting-screws threaded through the lugs, means for connecting the ends of the head to the lawn-mower and ribs against which the ends of the adjusting-screws abut.

5. In a lawn-mower, suitable gear-casings, an attachment comprising a head and teeth, the ends of the head being bent and formed with slots, studs in the slots by which the head is pivotally connected to the lawn-mower, and eyes carried by the ends of the head and hooks for engaging the eyes.

WALTER G. JOHNSON. [L. S.]

Witnesses:
E. V. ROBERTS,
KATE S. TAFT.